(12) United States Patent
Yao

(10) Patent No.: US 12,229,205 B2
(45) Date of Patent: *Feb. 18, 2025

(54) METHODS AND SYSTEMS FOR REFRESHING CURRENT PAGE INFORMATION

(71) Applicant: HITHINK ROYALFLUSH INFORMATION NETWORK CO., LTD., Zhejiang (CN)

(72) Inventor: Chengjie Yao, Hangzhou (CN)

(73) Assignee: HITHINK ROYALFLUSH INFORMATION NETWORK CO., LTD., Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/396,847

(22) Filed: Dec. 27, 2023

(65) Prior Publication Data
US 2024/0126823 A1    Apr. 18, 2024

Related U.S. Application Data

(63) Continuation of application No. 17/295,055, filed as application No. PCT/CN2020/082306 on Mar. 31, 2020, now Pat. No. 11,971,934.

(51) Int. Cl.
*G06F 16/00* (2019.01)
*G06F 3/01* (2006.01)
(Continued)

(52) U.S. Cl.
CPC .......... *G06F 16/9535* (2019.01); *G06F 3/011* (2013.01); *G06F 16/9574* (2019.01)

(58) Field of Classification Search
CPC ...... G06F 3/011; G06F 16/9574; G06F 3/017; G06F 16/9535; G06F 16/335;
(Continued)

(56) References Cited

U.S. PATENT DOCUMENTS 7,113,917 B2    9/2006  Jacobi et al.
9,841,863 B1 *  12/2017 Totale .................... G06F 3/048
(Continued)

FOREIGN PATENT DOCUMENTS

CN    102830922 A    12/2012
CN    103886090 A    6/2014
(Continued)

OTHER PUBLICATIONS

International Search Report in PCT/CN2020/082306 mailed on Dec. 24, 2020, 8 pages.
(Continued)

*Primary Examiner* — Yicun Wu
(74) *Attorney, Agent, or Firm* — METIS IP LLC

(57) ABSTRACT

The present disclosure discloses a method and system for refreshing current page information. The method may include: obtaining currently displayed information data in response to receiving an information refresh request from a user; determining possibly-interested information of the user based on the information refresh request and the currently-displayed information data; displaying the possibly-interested information of the user. The present disclosure may determine the possibly-interested information of the user based on the currently-displayed information data, and recommend data content of a different type from the currently-displayed information data to the user, which may broaden a browsing horizon of the user, and improve user experience.

20 Claims, 6 Drawing Sheets

(51) Int. Cl.
*G06F 16/9535* (2019.01)
*G06F 16/957* (2019.01)

(58) Field of Classification Search
CPC ........ G06F 16/00; G06F 40/20; G06F 40/205; G06F 16/951; G06Q 30/02; G06N 20/00
See application file for complete search history.

(56) References Cited

U.S. PATENT DOCUMENTS

| | | |
|---|---|---|
| 2006/0282856 A1 | 12/2006 | Errico et al. |
| 2013/0091013 A1 | 4/2013 | Wang et al. |
| 2014/0250177 A1 | 9/2014 | Sohn |
| 2015/0150052 A1 | 5/2015 | Errico et al. |
| 2015/0213487 A1 | 7/2015 | Nwosu |
| 2015/0339755 A1 | 11/2015 | Lewis |
| 2016/0196582 A1 | 7/2016 | Stone et al. |
| 2017/0242930 A1 | 8/2017 | Zhang et al. |
| 2019/0213194 A1 | 7/2019 | Zhang et al. |

FOREIGN PATENT DOCUMENTS

| | | |
|---|---|---|
| CN | 105260458 A | 1/2016 |
| CN | 105574182 A | 5/2016 |
| CN | 105630868 A | 6/2016 |
| CN | 105740468 A | 7/2016 |
| CN | 102332006 B | 8/2016 |
| CN | 107220850 A | 9/2017 |
| CN | 107944033 A | 4/2018 |
| CN | 108647349 A | 10/2018 |
| CN | 109284488 A | 1/2019 |
| CN | 109376536 A | 2/2019 |
| CN | 104809154 A | 3/2019 |
| CN | 109741134 A | 5/2019 |
| CN | 109819284 A | 5/2019 |
| CN | 109992715 | 7/2019 |
| CN | 110321477 | 10/2019 |
| CN | 110378732 | 10/2019 |
| CN | 111080378 A | 4/2020 |

OTHER PUBLICATIONS

Written Opinion in PCT/CN2020/082306 mailed on Dec. 24, 2020, 6 pages.
First Office Action in Chinese Application No. 202080005701.8 mailed on Dec. 18, 2023, 19 pages.

\* cited by examiner

300

```
In response to receiving an information refresh
request from a user, obtaining currently-displayed
information data
310
            │
            ▼
Determining possibly-interested information of the
user based on the information refresh request and
the currently-displayed information data
320
            │
            ▼
Displaying the possibly-interested information of
the user
330
```

```
┌─────────────────────────────────────┐
│ Determining a type of currently-displayed │
│ information data based on currently-displayed │
│      information data               │
│              410                    │
└─────────────────────────────────────┘
                  │
                  ▼
┌─────────────────────────────────────┐
│ Obtaining a type of possibly-interested information │
│ of a user by performing, based on an information │
│ refresh request and the currently-displayed │
│ information data, a reversal operation on the type │
│ of the currently-displayed information data │
│              420                    │
└─────────────────────────────────────┘
                  │
                  ▼
┌─────────────────────────────────────┐
│ Determining possibly-interested information of │
│ the user based on the type of the possibly- │
│   interested information of the user │
│              430                    │
└─────────────────────────────────────┘
```

```
Obtaining historical browsing information of a
user in response to receiving an information
refresh request from the user
510
          │
          ▼
Determining a type of information data that the
user is not interested in based on currently-
displayed information data and the historical
browsing information of the user
520
          │
          ▼
Obtaining a type of possibly-interested
information of the user by performing, based on
the information refresh request and a type of
information data that the user is not interested in,
a reversal operation on the type of information
data that the user is not interested in
530
          │
          ▼
Determining possibly-interested information of
the user based on the type of the possibly-
interested information of the user
540
```

FIG. 5

METHODS AND SYSTEMS FOR REFRESHING CURRENT PAGE INFORMATION

CROSS-REFERENCE TO RELATED APPLICATIONS

This application is a continuation of a U.S. application Ser. No. 17/295,055, filed on May 19, 2021, which is a national stage application of International Application No. PCT/CN2020/082306, filed on Mar. 31, 2020, the contents of which are hereby incorporated by reference.

TECHNICAL FIELD

The present disclosure relates to the field of content recommendation, in particular, to methods and systems for refreshing current page information.

BACKGROUND

With the rapid development of Internet technology, when users open a website of video, news, music, or shopping, etc., they often receive contents recommended by the website. However, users sometimes may not be interested in the contents recommended by the website, but want to learn more about different types of new information. Therefore, it is desirable to provide methods and systems for refreshing current page information.

SUMMARY

One of the embodiments of the present disclosure may provide a method for refreshing current page information. The method may include: in response to receiving an information fresh request from a user, obtaining currently-displayed information data; determining possibly-interested information of the user based on the information refresh request and the currently-displayed information data; displaying the possibly-interested information of the user to the user.

In some embodiments, the information refresh request from the user may be made by a coded gesture, a continuous click operation, a key click operation, a touch screen operation in a pause state, a continuous shaking operation, a voice input operation, a face recognition, a facial expression recognition, or an iris recognition.

In some embodiments, the information refresh request may be a reverse-information refresh request.

In some embodiments, the information refresh request may include a reversal threshold. The reversal threshold may be used to characterize a degree of association between refreshed information and the currently-displayed information data.

In some embodiments, a category of the reversal threshold may at least include a reversal of a same type, a reversal of different types, or a reversal of a minority type.

In some embodiments, determining possibly-interested information of the user based on the information refresh request and the currently-displayed information data may include: determining a type of the currently-displayed information data based on the currently-displayed information data; obtaining a type of the possibly-interested information of the user by performing, based on the information refresh request and the type of the currently-displayed information data, a reversal operation on the type of the currently-displayed information data; determining the possibly-interested information of the user based on the type of the possibly-interested information of the user.

In some embodiments, determining a type of the currently-displayed information data based on the currently-displayed information data may include: determining the type of the currently-displayed information data by processing the currently-displayed information data using a machine learning model.

In some embodiments, a machine learning model may include a classification model. The machine learning model may be obtained according to a process including: obtaining a training sample; the training samples may include historical displayed information data and a type of the historical displayed information data, the type of the historical displayed information data may be labelled as a type of reference information data; obtaining the machine by training a preliminary model based on the training sample.

In some embodiments, obtaining a type of the possibly-interested information of the user by performing, based on the information refresh request and the type of the currently-displayed information data, according to a reversal operation on the type of the currently-displayed information data may include: selecting, based on the type of the currently-displayed information data, at least one data type from a category of the reversal threshold as the type of the possibly-interested information of the user.

In some embodiments, determining possibly-interested information of the user based on the information refresh request and the currently-displayed information data may include: in response to receiving the information refresh request from the user, obtaining historical browsing information of the user; determining a type of information data that the user is not interested in based on the currently-displayed information data and the historical browsing information of the user; obtaining a type of the possibly-interested information of the user by performing, based on the information refresh request and the type of information data that the user is not interested in, a reversal operation on the type of the possibly-interested information of the user; determining the possibly-interested information of the user based on the type of the possibly-interested information of the user.

In some embodiments, displaying the possibly-interested information of the user to the user may include: displaying at least part of the possibly-interested information of the user on a terminal of the user according to a feed stream.

One of the embodiments of the present disclosure may provide a system for refreshing current page information. The system may include at least one memory configured to store computer instructions, and at least one processor in communication with the at least one memory. When the at least one processor executes the computer instructions, the at least one processor may cause the system to: in response to receiving an information refresh request from a user, obtain currently-displayed information data; determine possibly-interested information of the user based on the information refresh request and the currently-displayed information data; display the possibly-interested information of the user to the user.

In some embodiments, the information refresh request may be a reverse-information refresh request.

In some embodiments, to determine possibly-interested information of the user based on the information refresh request and the currently-displayed information data, the at least one processor may further cause the system to: determine a type of the currently-displayed information data based on the currently-displayed information data; obtain a type of the possibly-interested information of the user by performing, based on the information refresh request and the type of the currently-displayed information data, a reversal operation on the type of the currently-displayed information data; determine the possibly-interested information of the user based on the type of the possibly-interested information of the user.

In some embodiments, to determine a type of the currently-displayed information data based on the currently-displayed information data, the at least one processor may further cause the system to: determine the type of the currently-displayed information data by processing the currently-displayed information data using a machine learning model.

In some embodiments, to obtain a type of the possibly-interested information of the user by performing, based on the type of the currently-displayed information data, a reversal operation on the type of the currently-displayed information data, the at least one processor may further cause the system to: select, based on the currently-displayed information data, at least one data type from a category of the reversal threshold as the type of the possibly-interested information of the user.

In some embodiments, to determine possibly-interested information of the user based on the information refresh request and the currently-displayed information data, the at least one processor may further cause the system to: in response to receiving the information refresh request from the user, obtain historical browsing information of the user; determine a type of information data that the user is not interested in based on the currently-displayed information data and the historical browsing information of the user; obtain a type of the possibly-interested information of the user by performing, based on the information refresh request and the type of information data that the user is not interested in, a reversal operation on the type of the information data that the user is not interested in; determine the possibly-interested information of the user based on the type of the possibly-interested information of the user.

In some embodiments, to display the possibly-interested information of the user to the user, the at least one processor may further cause the system to: display at least part of the possibly-interested information of the user on a terminal of the user according to a feed stream.

One of the embodiments of the present disclosure may provide a system for refreshing current page information. The system may include: an obtaining module configured to obtain currently-displayed information data in response to receiving an information refresh request from a user; a determining module configured to determine possibly-interested information of the user based on the information refresh request and the currently-displayed information data; a display module configured to display the possibly-interested information of the user to the user.

According to another aspect of the present disclosure, it may relate to a computer-readable storage medium. The storage medium may store computer instructions. When a computer reads the computer instructions in the storage medium, the computer may execute the methods described in any embodiment of the present disclosure.

BRIEF DESCRIPTION OF THE DRAWINGS

The present disclosure may further be illustrated in terms of exemplary embodiments. These exemplary embodiments may be described in detail with reference to the drawings. The embodiments may not be restrictive. In the embodiments, the same number may represent the same structure, wherein:

FIG. 3 is an exemplary flowchart of a process for refreshing current page information according to some embodiments of the present disclosure;

FIG. 4 is an exemplary flowchart of a process for determining possibly-interested information of a user according to some embodiments of the present disclosure;

FIG. 5 is an exemplary flowchart of a process for determining possibly-interested information of a user according to some embodiments of the present disclosure.

DETAILED DESCRIPTION

Figure 1:
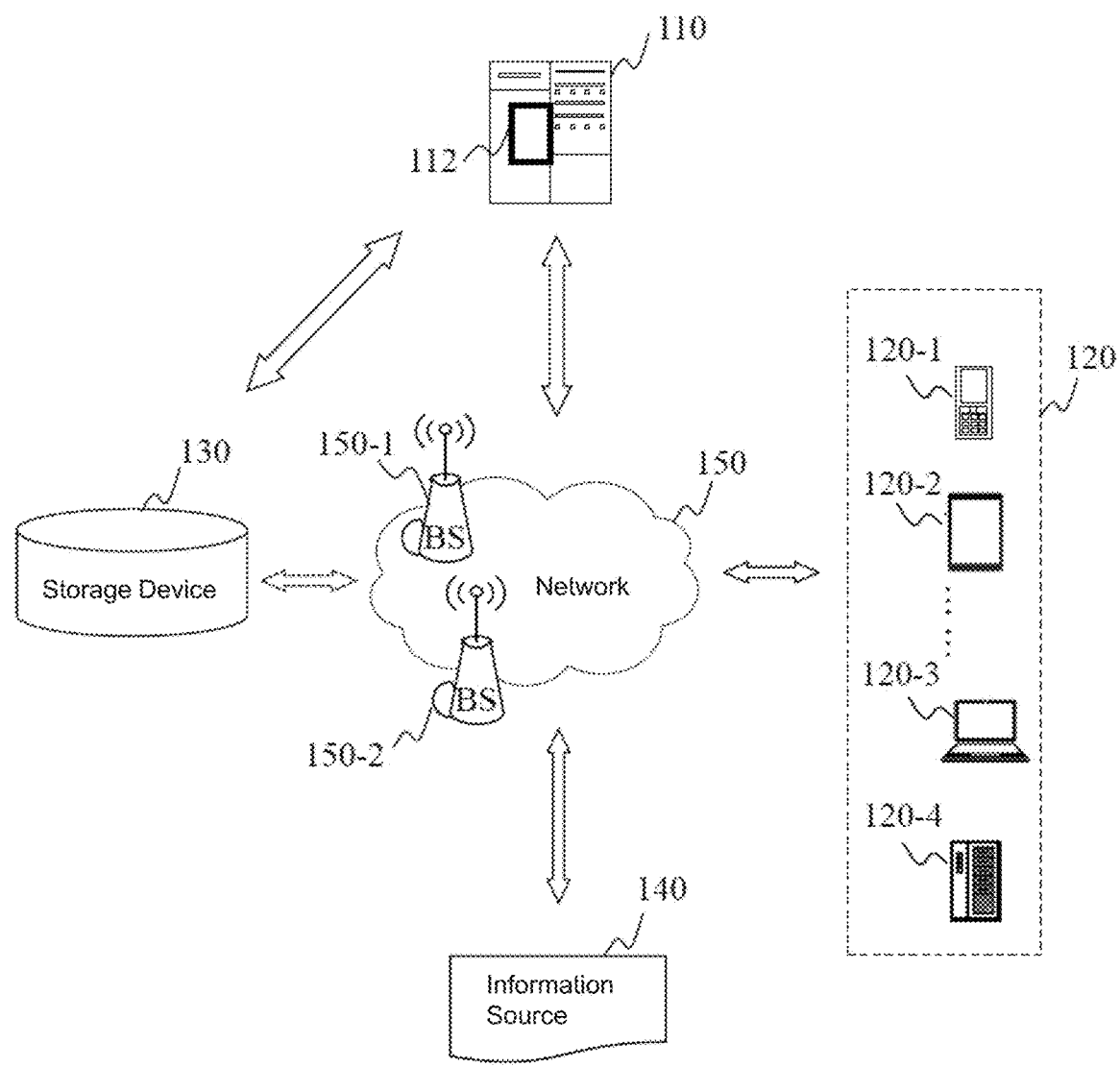
FIG. 1 is a diagram illustrating an application scenario of a current page information refresh system according to some embodiments of the present disclosure.

To describe the technical solutions of the embodiments of the present disclosure more clearly, the following may briefly introduce the drawings for the description of the embodiments. Obviously, the drawings in the following description may be only some examples or embodiments of the present disclosure. For those skilled in the art, without creative work, the present disclosure may be applied to other similar scenarios based on the drawings. Unless obviously obtained from the context or the context is illustrated otherwise, the same number in the drawings may refer to the same structure or operation.

It should be understood that the "system," "device," "unit," and/or "module" used herein may be a way to distinguish different components, elements, units, parts, or assemblies of different levels. However, if other words may achieve the same purpose, the words may be replaced by other expressions.

As used in the disclosure and the appended claims, the singular forms "a," "an," and "the" may include plural referents unless the content is clearly dictated otherwise. Generally speaking, the terms "comprising" and "including" only suggest that the steps and elements that have been clearly identified may be included, the steps and elements do not constitute an exclusive list, and the method or device may also include other steps or elements.

In the present disclosure, a flowchart may be used to illustrate the operations performed by the system according to the embodiments of the present disclosure. It should be understood that the preceding or following operations may not be performed in order precisely. Instead, the individual step may be processed in reverse order, or at the same time. At the same time, other operations may also be added to these processes, or a step or several operations may be removed from these processes.

FIG. 1 is a diagram illustrating an application scenario of a current page information refresh system according to some embodiments of the present disclosure.

A current page information refresh system 100 may refresh displayed information of a current page according to the needs of a user, so that the user may learn more about other types of information. The current page information refresh system 100 may be a service platform for the Internet or other networks. For example, the current page information refresh system 100 may be an online service platform that provides the user with information or video information. In some embodiments, the current page information refresh system 100 may be applied to an online shopping service, such as buying clothes, books, daily necessities, or the like. In some embodiments, the current page information refresh system 100 may also be applied to the field of travel (e.g., tourism) services. The current page information refresh system 100 may include, but is not limited to, a server 110, a user terminal 120, a storage device 130, an information source 140, and a network 150.

In some embodiments, the server 110 may be configured to process information and/or data related to a service request, for example, to process an information refresh request from a user. Specifically, the server 110 may receive the information refresh request from the user terminal 120, and process the information refresh request and send possibly-interested information of the user to the user terminal 120. In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the storage device 130 and the user terminal 120 via the network 150. As another example, the server 110 may be directly connected to the storage device 130 and the user terminal 120 to access the stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multiple cloud, or the like, or any combination thereof.

In some embodiments, the server 110 may include a processing engine 112. The processing engine 112 may process data and/or information related to a current page information refresh request to perform one or more functions described in the present disclosure. For example, the processing engine 112 may receive an information refresh request sent by the user terminal 120, obtain currently-displayed information data, determine possibly-interested information of the user based on the information refresh request and the currently-displayed information data, and finally display the possibly-interested information of the user. In some embodiments, the processing engine 112 may include one or more processing engines (e.g., a single-chip processing engine or a multi-chip processor). Merely by way of example, the processing engine 112 may include a central processing unit (CPU), an application-specific integrated circuit (ASIC), an application-specific instruction-set processor (ASIP), an image processing unit (GPU), a physical operation processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the user terminal 120 may be a person, a tool, or other entities directly related to an information refresh request. A user may be an information refresh requester. In the present disclosure, "user" and "user terminal" may be used interchangeably. In some embodiments, the user terminal 120 may include a mobile device 120-1, a tablet computer 120-2, a laptop computer 120-3, a desktop computer 120-4, or the like, or any combination thereof. In some embodiments, the mobile device 120-1 may include a smart home device, a wearable device, a smart mobile device, a virtual reality device, an augmented reality device, or the like, or any combination thereof. In some embodiments, a smart home device may include a smart lighting device, a smart electrical appliance control device, a smart monitoring device, a smart TV, a smart camera, a walkie-talkie, or the like, or any combination thereof. In some embodiments, a wearable device may include a smart bracelet, smart footwear, smart glasses, a smart helmet, a smartwatch, a smart wearer, a smart backpack, smart accessories, or the like, or any combination thereof. In some embodiments, a smart mobile device may include a smartphone, a personal digital assistant (PDA), a gaming device, a navigation device, a point of sale (POS), or the like, or any combination thereof. In some embodiments, a virtual reality device and/or an augmented reality device may include a virtual reality helmet, virtual reality glasses, virtual reality goggles, an augmented virtual reality helmet, augmented reality glasses, augmented reality goggles, or the like, or any combination thereof. For example, the virtual reality device and/or augmented reality device may include Google Glass, Oculus Rift, HoloLens, Gear VR, or the like.

The storage device 130 may store data and/or instructions related to an information refresh request from a user. In some embodiments, the storage device 130 may store currently-displayed information data. In some embodiments, the storage device 130 may store historical browsing information of the user. In some embodiments, the storage device 130 may store data and/or instructions used by the server 110 to execute or complete the exemplary methods described in the present disclosure. In some embodiments, the storage device 130 may include a mass memory, a removable memory, a volatile read-write memory, a read-only memory (ROM), or the like, or any combination thereof. Exemplary mass storage devices may include a magnetic disk, an optical disk, a solid-state disk, or the like. Exemplary removable storages may include a flash drive, a floppy disk, an optical disk, a memory card, a compact disk, a magnetic tape, or the like. Exemplary volatile read-only memories may include a random-access memory (RAM). Exemplary RAMs may include a dynamic RAM (DRAM), a double rate synchronous dynamic RAM (DDR SDRAM), a static RAM (SRAM), a thyristor RAM (T-RAM), a zero capacitance RAM (Z-RAM), or the like. Exemplary ROMs may include a mask ROM (MROM), a programmable ROM (PROM), an erasable programmable ROM (PEROM), an electronically erasable programmable ROM (EEPROM), a compact disk ROM (CD-ROM), a digital general-purpose disk ROM, or the like. In some embodiments, the storage device 130 may be implemented on a cloud platform. Merely by way of example, the cloud platform may include a private cloud, a public cloud, a hybrid cloud, a community cloud, a distributed cloud, an internal cloud, a multi-layer cloud, or the like, or any combination thereof.

In some embodiments, the storage device 130 may be connected to the network 150 to communicate with one or more components (e.g., the server 110, the user terminal 120) in the current page information refresh system 100. The one or more components in the current page information refresh system 100 may access data or instructions stored in the storage device 130 through the network 150. In some embodiments, the storage device 130 may directly connect to or communicate with the one or more components (e.g., the server 110, the user terminal 120) of the current page information refresh system 100. In some embodiments, the storage device 130 may be part of the server 110.

The network 150 may facilitate the exchange of information and/or data. In some embodiments, one or more components (e.g., the server 110, the user terminal 120, and the storage device 130) in the current page information refresh system 100 may send information and/or data to/receive information and/or data from other components of the current page information refresh system 100 via the network 150. For example, the server 110 may obtain/acquire a service request (e.g., an information refresh request) from the user terminal 120 through the network 150. In some embodiments, the network 150 may be any form of wired or wireless networks, or any combination thereof. Merely by way of example, the network 150 may include a cable network, a wired network, an optical fiber network, a telecommunication network, an internal network, Internet, a local area network (LAN), a wide area network (WAN), a wireless local area network (WLAN), a metropolitan area network (MAN), a wide area network (WAN), a public switched telephone network (PSTN), a Bluetooth network, a Zigbee network, a near field communication (NFC) network, a global system for mobile communications (GSM) network, a code division multiple access (CDMA) network, a time division multiple access (TDMA) network, a general packet radio service (GPRS) network, an enhanced data rate GSM evolution (EDGE) network, a wideband code division multiple access (WCDMA) network, a high-speed downlink packet access (HSDPA) network, a long-term evolution (LTE) network, a user datagram protocol (UDP) network, a transmission control protocol/Internet protocol (TCP/IP) network, a short message service (SMS) network, a wireless application protocol (WAP) network, a ultra-wideband (UWB) network, an infrared, or the like, or any combination thereof. In some embodiments, the current page information refresh system 100 may include one or more network access points. For example, the current page information refresh system 100 may include wired or wireless network access points, such as base stations and/or wireless network access points 150-1, 150-2, . . . , through which one or more components of the current page information refresh system 100 may be connected to the network 150 to exchange data and/or information.

In some embodiments, the information source 140 may generally refer to all information sources except the information provided by the user terminal 120. The information source 140 may include, but is not limited to, various information sources that may provide information, such as a shopping website, a portal website, a stock exchange, a microblogging, a blog, a personal website, a library, or the like. The information source 140 may be implemented in a single central server, multiple servers, or multiple personal devices connected through a communication link. When the information source 140 is implemented in the multiple personal devices, the personal device may generate content (e.g., referred to as a "user-generated content"), such as an uploading text, a sound, an image, a video, etc., to the cloud server, thus the cloud server and the multiple personal devices connected to the cloud server may form the information source. In some embodiments, the information source 140 may provide some relevant information, including but is not limited to, securities news, market analysis, social hotspots, financial opinions, market analysis, industry research reports, company announcements, investment opportunities, funds, commodities, Hong Kong stocks, US stocks, or the like, or any combination thereof.

Figure 2:
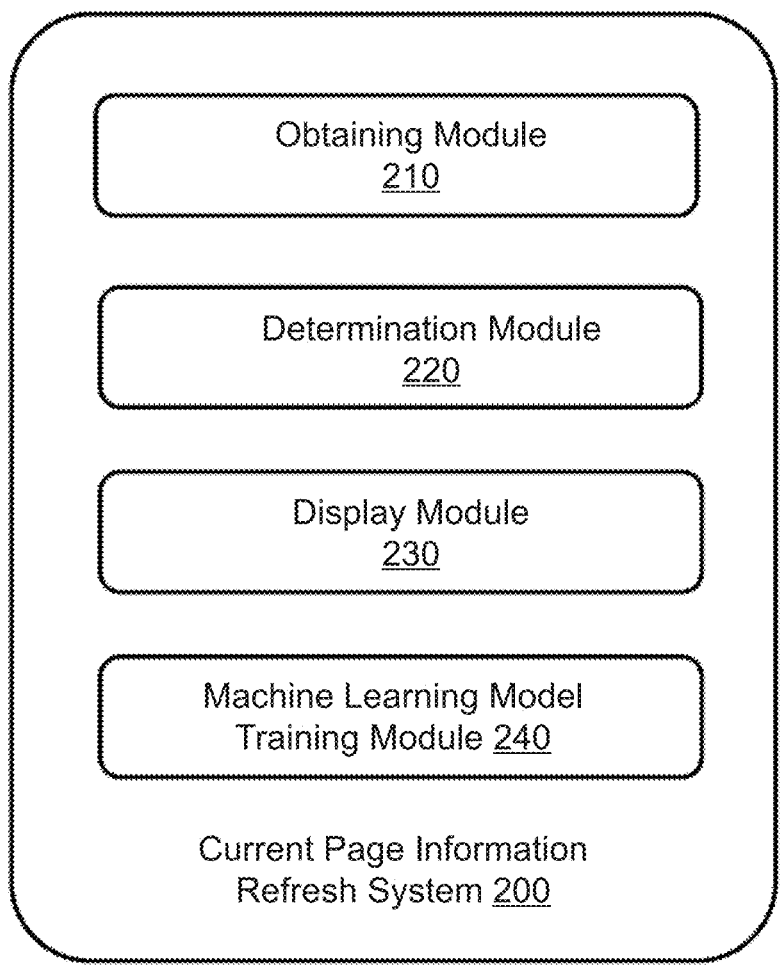
FIG. 2 is a block diagram of a current page information refresh system according to some embodiments of the present disclosure.

FIG. 2 is a block diagram of a current page information refresh system according to some embodiments of the present disclosure.

As shown in FIG. 2, the current page information refresh system may include an obtaining module 210, a determination module 220, a display module 230, and a machine learning model training module 240.

The obtaining module 210 may be configured to obtain currently-displayed information data in response to receiving an information refresh request from a user. In some embodiments, the information refresh request from the user may be made by a coded gesture, a continuous click operation, a key click operation, a touch screen operation in a pause state, a continuous shaking operation, a voice input operation, a face recognition, a facial expression recognition, or an iris recognition. In some embodiments, the information refresh request may be a reverse-information refresh request. In some embodiments, the information refresh request may include a reversal threshold. The reversal threshold may be used to characterize a degree of association between refreshed information and the currently-displayed information data. In some embodiments, a category of the reversal threshold may at least include a reversal of a same type, a reversal of different types, or a reversal of a minority type. More descriptions regarding obtaining the currently-displayed information data may be found in FIG. 3, which are not repeated here.

The determination module 220 may be configured to determine possibly-interested information of a user based on information refresh request and currently-displayed information data. Specifically, a type of the currently-displayed information data may be determined based on the currently-displayed information data. A reversal processing operation may then be performed on the type of the currently-displayed information data based on the information refresh request and the type of the currently-displayed information data to obtain a type of the possibly-interested information of the user. The possibly-interested information of the user may further be determined based on the type of the possibly-interested information of the user. More descriptions regarding determining the possibly-interested information of the user may be found in FIG. 4, which are not repeated here.

In some embodiments, the possibly-interested information of the user may be determined based on the information refresh request, the currently-displayed information data, and historical browsing information of the user. Specifically, the historical browsing information of the user may be obtained in response to receiving the information refresh request from the user. A type of information data that the user is not interested in may be determined based on the currently-displayed information data and the historical browsing information of the user. The type of the possibly-interested information of the user may be obtained by performing, based on the information refresh request and the type of information data that the user is not interested in, a reversal operation on the information data that the user is not interested in. The possibly-interested information of the user may be determined based on the type of the possibly-interested information of the user. More descriptions regarding determining the possibly-interested information of the user may be found in FIG. 5, which are not repeated here.

The display module 230 may be configured to display possibly-interested information of a user. Specifically, at least part of the possibly-interested information of the user may be displayed on a terminal of the user according to a feed stream. More descriptions regarding displaying the possibly-interested information of the user may be found in FIG. 3, which are not repeated here.

The machine learning model training module 240 may be configured to train a preliminary model to obtain a machine learning model. Specifically, a training sample may be obtained. The training sample may include historical displayed information data and a type of the historical displayed information data. The type of the historical displayed information data may be labelled as a type of reference information data. The machine learning model may be obtained by training the preliminary model based on the training sample. More descriptions regarding training the preliminary model to obtain the machine learning model may be found in FIG. 6, which are not repeated here.

It should be understood that the system and the modules shown in FIG. 2 may be implemented in various ways. For example, in some embodiments, the system and the modules thereof may be implemented by hardware, software, or a combination of software and hardware. The hardware portion may be realized by dedicated logic. The software portion may be stored in the memory and executed by an appropriate instruction execution system, such as a microprocessor or a dedicated design hardware. Those skilled in the art may understand that the above methods and systems may be implemented using computer-executable instructions and/or included in processor control codes. For example, such codes may be provided on a carrier medium such as a disk, CD, or DVD-ROM, a programmable memory such as a read-only memory (firmware), or a data carrier such as an optical or an electronic signal carrier. The system and the modules thereof described in the present disclosure may not only be implemented by a hardware circuit such as a very large-scale integrated circuit or a gate array, a semiconductor such as a logic chip, a transistor, etc., or a programmable hardware device such as a field programmable gate array, a programmable logic device, etc. The system and the modules thereof also may be implemented by software executed by various types of processors. The system and the modules thereof also may be implemented by a combination of the above hardware circuit and software (e.g., firmware).

It should be noted that the above description of the current page information refresh system and the modules thereof are merely provided for the purposes of illustration, and not intended to limit the scope of the present disclosure. It should be understood that for those skilled in the art, after understanding the principle of the system, it may be possible to arbitrarily combine various modules, or form a subsystem to connect with other modules without departing from the principle. For example, in some embodiments, the obtaining module 210, the determination module 220, the display module 230, and the machine learning model training module 240 may be different modules in the system, or a single module which can implement the functions of more than two modules. As another example, the determination module 220 and the machine learning model training module 240 may be two modules, or a single module having a function of determining the possibly-interested information of the user and a function of training a model. As another example, modules may share a storage module, or each module may have its own storage module. Such variations do not depart from the scope of the present disclosure.

FIG. 3 is an exemplary flowchart of a process for refreshing current page information according to some embodiments of the present disclosure.

In operation 310, in response to receiving an information refresh request from a user, currently-displayed information data may be obtained. In some embodiments, operation 310 may be implemented by the obtaining module 210.

In some embodiments, the user may be a user who uses or browses an interface of a current application (also referred to as a first-party), or a user who uses or browses a third-party application through the interface of the current application. The third-party application may be other applications relative to the current application. For example, if Tencent Video website is the current application, and a Jingdong shopping advertisement appears on a page of the Tencent Video website, then Jingdong may be a third-party application. The user may jump to a Jingdong shopping page by clicking the Jingdong shopping advertisement on the page of the Tencent Video website.

In some embodiments, the information refresh request may include an instruction of the user to request a re-recommendation of a currently-browsed resource. For example, when the user browses the interface of Douyin short video APP for a period of time and hopes the Douyin short video APP recommend some new videos, the user may send a refresh request by pulling down a page. In some embodiments, the information refresh request from the user may be made by a coded gesture, a continuous click operation, a key click operation, a touch screen operation in a pause state, a continuous shaking operation, a voice input operation, a face recognition, a facial expression recognition, or an iris recognition. The coded gesture may include drawing x, drawing √, or drawing a Z-shape on a screen. The coded gesture may also include clicking a code input controller on a screen, and inputting a digital code or a specific character in a pop-up code input box. The continuous click operation may include completing multiple clicks (e.g., 2 times, 3 times, or 4 times) on a screen in a short period of time (e.g., 3 seconds). The key click operation may be that, a function key is set on an interface of a current application, and the information refresh request is completed by clicking the function key. The touch screen operation in a pause state may include touching a screen continuously in a period of time (e.g., 3 seconds, 4 seconds, or 5 seconds). The continuous shaking operation may include continuously (e.g., 3 seconds, 4 seconds, or 5 seconds) keeping a user terminal in a motion state (e.g., shaking a mobile phone strongly for 5 seconds) based on a specific intensity. The voice input operation may be that a voice segment of a user includes a specific voice content text or instruction, for example, a content text or instruction including "information refresh." The face recognition may be that an image or a video stream of a human face is obtained via a camera device on a user terminal, and an identity recognition is performed based on facial feature information to verify whether to send the information refresh request. For example, if the face verification is passed, an instruction of the information refresh request may be sent; otherwise, the instruction of the information refresh request may not be sent. The facial expression recognition may be that, an image or a video stream of a human face is obtained via a camera of a user terminal, and a specific facial expression state is separated to verify whether to send the information refresh request. For example, if the facial expression state is "smile," the verification may be passed, and the information refresh request instruction may be sent. If the facial expression state is other states (e.g., frowning, crying, angry), the verification may not be passed, and the information refresh request instruction may not be sent. The iris recognition may be that, an iris of the user may be obtained via a camera of a user terminal to verify whether to send the information refresh request. For example, if the iris recognition is passed, the information refresh request instruction may be sent; otherwise, the information refresh request instruction may not be sent.

In some embodiments, the currently-displayed information data may be information data of the first-party application currently displayed on the user terminal, or information data of the third-party application currently displayed on the user terminal.

The information refresh request may be a request to refresh the information currently displayed on the page of the user terminal. In some embodiments, the information refresh request may be a resemble-information refresh request. The resemble-information refresh request may include an instruction of the user to request a re-recommendation of other information of the same type as the information currently displayed on the page of the user terminal. In some embodiments, the information refresh request may be a reverse-information refresh request. The reverse-information refresh request may include an instruction of the user to request a re-recommendation of other information of a different type from the information currently displayed on the page of the user terminal. In some embodiments, the way in which the user sends the resemble-information refresh request or the reverse-information refresh request may be preset by the user, or may be a default system setting.

In some embodiments, the information refresh request may include a reversal threshold. The reversal threshold may be used to characterize a degree of association between refreshed information and the currently-displayed information data, that is, a reversal level or a reversal degree. In some embodiments, the reversal threshold may include 0-10 levels, or other symbols describing the intensity of the levels (e.g., A-K levels), which is not limited in the present disclosure. Specifically, if the reversal threshold is relatively high, the reversal degree of the recommended content may be relatively high, and the degree of association between the refreshed information and the currently-displayed information data may be relatively low. If the reversal threshold is relatively low, the recommended content may be partially reversed, and the degree of association between the refreshed information and the currently-displayed information data may be relatively high. For example, if a user uses a car APP, and a price range of cars that the user has viewed or paid attention for a long time is between 100,000 and 200,000. When the user sets the reversal threshold as level 0, after the user sends a reverse-information refresh request, the price of the recommended cars of the car APP may be between 100,000 and 200,000. When the user sets the reversal threshold as level 10, after the user sends the reverse-information refresh request, the car APP recommends cars with the price other than the price range of 100,000 to 200,000. When the user sets the reversal threshold as levels 1-9, after the user sends the reverse-information refresh request, the car APP recommends cars with the price between 100,000 and 200,000, and cars in other price ranges.

In some embodiments, a category of the reversal threshold may at least include a reversal of a same type, a reversal of different types, or a reversal of a minority type. The reversal of the same type may be a reversal of a subtype in a same major type. For example, a subtype in a major type may be a basketball in sports, and the reversal of a same type may be the latest news of the sports such as a table tennis, a badminton, a volleyball, etc. The reversal of different types may be a reversal of a major type. For example, if a certain type is sports, and the reversal of different types may be an entertainment, a military, a finance, a tourism, a history, etc. The reversal of the minority type may be a type (including the major type and/or the subtype) with low attention and few attention groups, such as an astronomy, a mathematical conjecture, a religious study, a curling project, etc. In some embodiments, the category of the reversal threshold may be set as at least one of the reversal of the same type, the reversal of different types, or the reversal of the minority type. In some embodiments, a setting method of the reversal threshold may include a radar chart, a percentage, a level, or the like. In some embodiments, the radar chart may include one or more categories of the reversal threshold. The reversal degree of the reverse refresh may be adjusted by setting the proportions of different categories of the reversal threshold. For example, the radar chart may include four categories: a non-reversal of a same type, the reversal of the same type, the reversal of different types, and the reversal of the minority type. The non-reversal of the same type may be that the type of the refreshed information is the same as the type of the currently-displayed information. The proportions of the four categories may be set as 0%, 10%, 50%, and 40%. The recommended content may not include the content with the same type as the currently-displayed information data, but may include 10% reversal content of the same type, 50% reversal of different types, and 40% reversal of the minority type. As another example, the proportion of the non-reversal of the same type may be set as 0%, the proportion of the reversal of the same type may be set as 0%, the proportion of the reversal of different types may be set as 0%, and the proportion of the reversal of the minority type may be set as 100%. The recommended content may only include the reversal content of the minority type. Optionally, the radar chart may include only three categories: the reversal of the same type, the reversal of different types, and the reversal of the minority type. The radar chart may also be in other forms, which is not limited in the present disclosure. By setting the proportions of different categories, the recommended content may be reversed in different types and degrees. As another example, the degree of reverse refresh may be adjusted by setting different percentages or levels. The percentage or level may correspond to the proportion of each category of different categories of the reversal threshold. Merely by way of example, the percentage of the reversal threshold may be set as 80% (or level H), and the recommended content may include 50% reversal of different types and 50% reversal of the minority type. The percentage or level may be preset by the system, or determined by a background server through a corresponding algorithm, which is not limited in the present disclosure. In some embodiments, after the user sends the information refresh request, the reversal threshold may be set in a function setting box that pops up on an application page. The reversal threshold may also be set through a function controller of the application page before the user sends the information refresh request. The reversal threshold may also be a system default setting.

In some embodiments, the reverse-information refresh request from the user may be the reverse-information refresh request for the recommended content of a current application from the user.

In some embodiments, the reverse-information refresh request from the user may be the reverse-information refresh request for the recommended content of a third-party application from the user. The third-party application may obtain the reverse-information refresh request for the third-party application from the user on the current application. In some embodiments, the third-party application may obtain the reverse-information refresh request for the third-party application from the user based on a plug-in of the third-party application. The plug-in of the third-party application may only run on a first-party application platform specified by a program (multiple platforms may be supported at the same time), and cannot run separately from the designated first-party application platform. For example, Taobao needs to place an advertisement on an application platform such as Toutiao, Douyin, Weibo, etc., and a plug-in of Taobao for the third-party application may support the first-party application platform such as Toutiao, Douyin, Weibo, etc., to enter Taobao for shopping. The plug-in of the third-party application may be a tool for the third-party application to interact with the current application. For example, the plug-in of the third-party application may have functions of obtaining the reverse-information refresh request for the third-party application from the user on the current application, obtaining the currently-displayed information data of the third-party application, determining the possibly-interested information of the third-party application of the user, and displaying the possibly-interested information of the third-party application to the user, or the like.

In some embodiments, the obtaining module 210 may obtain the information refresh request of the user by an operation (e.g., a coded gesture, a continuous click operation, a key click operation, a touch screen operation in a pause state, a continuous shaking operation, a voice input operation, a face recognition, a facial expression recognition, or an iris recognition) of the user on the user terminal. By setting a relatively simple information refresh request operation, the user can use the application more conveniently and quickly, which can bring a better use experience to the user.

In operation 320, possibly-interested information of the user may be determined based on the information refresh request and the currently-displayed information data. In some embodiments, operation 320 may be implemented by the determination module 220.

In some embodiments, the possibly-interested information of the user may include information that the user desires to browse. In some embodiments, the possibly-interested information of the user may be information of a first-party application that the user desires to browse, or information of a third-party application that the user desires to browse.

In some embodiments, the possibly-interested information of the user may be determined based on the information refresh request and the currently-displayed information data. Specifically, a type of the currently-displayed information data may be determined based on the currently-displayed information data. A type of the possibly-interested information of the user may be obtained by performing, based on the information refresh request and the type of the currently-displayed information data, a reversal operation on the type of the currently-displayed information data. The possibly-interested information of the user may be determined based on the type of the possibly-interested information of the user. More descriptions regarding determining the possibly-interested information of the user may be found in FIG. 4, which are not repeated here.

In some embodiments, the possibly-interested information of the user may be determined based on the information refresh request, the currently-displayed information data, and historical browsing information of the user. Specifically, in response to receiving the information refresh request from the user, the historical browsing information of the user may be obtained. A type of information data that the user is not interested in may be determined based on the currently-displayed information data and the historical browsing information of the user. The type of the possibly-interested information of the user may be obtained by performing, based on the information refresh request and the type of information data that the user is not interested in, the reversal operation on the type of the information data that the user is not interested in. The possibly-interested information of the user may be determined based on the type of the possibly-interested information of the user. More descriptions regarding determining the possibly-interested information of the user may be found in FIG. 5, which are not repeated here.

In some embodiments, if the information refresh request of the user is an information refresh request for a third-party application, a plug-in of the third-party application may determine the possibly-interested information of the user based on the currently-displayed information data of a current application. Specifically, the plug-in of the third-party application may map a data type of the current application (the first-party application) to a data type of the third-party application, and establish a correspondence relationship between at least one data type of the current application and at least one data type of the third-party application. The type of the currently-displayed information data of the current application may be determined based on the currently-displayed information data of the current application and the data type of the current application (the first-party). The corresponding type of the information data of the third-party application may be determined based on the correspondence relationship between data types. The type of the possibly-interested information of the user on the third-party application may be determined by performing a reversal operation on the corresponding type of the information data of the third-party application. The possibly-interested information of the user on the third-party application may be determined. The determination of the possibly-interested information of the user on the third-party application may be similar to the descriptions of FIG. 4, which are not repeated here. Optionally, the correspondence relationship between the at least one data type in the current application and the at least one data type in the third-party application may be one-to-one, one-to-many, many-to-one, or many-to-many, which is not limited in the present disclosure. More descriptions regarding obtaining the data type in the current application (the first-party application) may be found in operation 420, which are not repeated here.

In some embodiments, if the information refresh request of the user is the information refresh request for a third-party application, a plug-in of the third-party application may determine the possibly-interested information of the user based on the currently-displayed information data of the current application and historical browsing information of the user of the current application. Specifically, the plug-in of the third-party application may map the data type of the current application (the first-party application) to the data type of the third-party application, and establish the correspondence relationship between the at least one data type of the current application and the at least one data type of the third-party application. A type of information data that the user is not interested in on the current application may be determined based on the currently-displayed information data of the current application, the historical browsing information of the user of the current application, and a data type of the current application (the first-party). The corresponding type of information data that the user is not interested in on the third-party application may be determined based on the correspondence relationship between data types. The type of the possibly-interested information of the user on the third-party application may be obtained by performing the reversal operation on the type of information data that the user is not interested in on the third-party application. The possibly-interested information of the user on the third-party application may be determined. The descriptions of the determination of the possibly-interested information of the user on the third-party application may be similar to the descriptions of FIG. 5, which are not repeated here.

In some embodiments, the determination module 220 may determine the possibly-interested information of the user based on the information refresh request and the currently-displayed information data.

In operation 330, the possibly-interested information of the user may be displayed. In some embodiments, operation 330 may be implemented by the display module 230.

In some embodiments, the possibly-interested information of the user may be all data information generated within a period of time (e.g., one week, three days, one day, twelve hours, or one hour) before a current time in a current application or a third-party application. In some embodiments, at least part of the possibly-interested information of the user may be displayed on a page of the user terminal according to a feed stream. The feed stream may be a way of displaying content to the user and updating continuously. The possibly-interested information of the user may be determined based on the information refresh request and the currently-displayed information data. The possibly-interested information of the user may be displayed by refreshing a page. In some embodiments, the feed stream may include three modes including a push mode, a pull mode, and a push-pull hybrid mode. In some embodiments, the push mode may be that a server pushes the determined possibly-interested information of the user to some other users after the user generates content, which may be suitable for an application with a relatively uniform number of user relationships and has an upper limit, such as a circle of friends. The pull mode may be that when an information refresh request is issued, a page may display updated data according to a certain rule, such as an update time, a popularity, an editor's recommendation, etc., which may be suitable for an application with a small number of users and a low daily activity. The push-pull hybrid mode may include an online push and an offline pull (e.g., after a Weibo verified person publishes news, the news may be pushed to online fans, and offline fans may pull the news after they are online), and a timing push and an offline pull (e.g., after a Weibo verified person published news, the news may be pushed to the fans in a form of a permanent process). In some embodiments, the feed stream may continuously update the possibly-interested information of the user based on a user operation (e.g., a pull-up or pull-down operation). In some embodiments, the possibly-interested information of the user displayed in the feed stream may be sorted by a timeline (a time order), for example, sorted by a chronological order of publication. The content that are released first may be seen first, and the content that are released later may be arranged at the top. In some embodiments, the possibly-interested information of the user displayed in the feed stream may be sorted by a rank (a non-time factor), for example, sorted by a degree of popularity. The possibly-interested information of the user may be sorted by a degree of popularity, and the most popular information may be recommended first.

It should be noted that the above description of the process 300 is merely provided for the purposes of illustration, and not intended to limit the scope of the present disclosure. For persons having ordinary skills in the art, multiple variations and modifications may be made to the process 300 under the teachings of the present disclosure. However, those variations and modifications do not depart from the scope of the present disclosure. For example, in operation 310, the currently-displayed information data may be obtained when the user logs in the current application platform. The possibly-interested information of the user may be determined when receiving the information refresh request of the user. It does not have to be limited to the obtaining after receiving the information refresh request of the user.

FIG. 4 is an exemplary flowchart of a process for determining possibly-interested information of a user according to some embodiments of the present disclosure. As shown in FIG. 4, a process 400 for determining the possibly-interested information of the user may include:

In operation 410, a type of currently-displayed information data may be determined based on the currently-displayed information data. In some embodiments, operation 410 may be performed by the determination module 220.

In some embodiments, the type of the currently-displayed information data may be a data type of the currently-displayed information data. In some embodiments, the data type may be a data tag of massive data in a database of the current page information refresh system (e.g., the storage device 130). The data tag may be obtained by labelling the massive data based on an algorithm. In some embodiments, the data type may include a major type label and a subtype label. In some embodiments, the data type may include two or more types. The type of the currently-displayed information data may include at least one or more data types.

In some embodiments, the type of the currently-displayed information data may be determined using a machine learning model. Specifically, the currently-displayed information data may be inputted into the machine learning model for processing, and the type of the currently-displayed information data may be outputted.

In some embodiments, the machine learning model may include a classification model, for example, a decision tree, a Bayes classification, a random forest, a support vector machine, a neural network, or the like. In some embodiments, the decision tree model may include, but is not limited to, a classification and regression tree (CART), an iterative dichotomiser 3 (ID3), a C4.5 algorithm, a random forest, a chisquared automatic interaction detection (CHAID), a multivariate adaptive regression splines (MARS), a gradient boosting machine (GBM), or the like, or any combination thereof. The machine learning model may be obtained based on a preliminary training model. More descriptions regarding the preliminary model and the training process may be found in FIG. 6, which are not repeated here.

In some embodiments, the determination module 220 may access the machine learning model stored in the storage device 130 through the network 150, and determine the type of the currently-displayed information data based on the currently-displayed information data.

In operation 420, a type of the possibly-interested information of the user may be obtained by performing, based on the information refresh request and the type of the currently-displayed information data, a reversal operation on the type of the currently-displayed information data. In some embodiments, operation 420 may be performed by the determination module 220.

In some embodiments, the type of the possibly-interested information of the user may include the data type of the information that the user desires to browse. In some embodiments, at least one data type may be selected from the category of the reversal threshold as the type of the possibly-interested information of the user based on the type of the currently-displayed information data. Specifically, data types may be obtained, and then at least one data type other than the type of the currently-displayed information data (i.e., in the category of a reversal threshold) may be selected from the data types as the type of the possibly-interested information of the user.

The category of the reversal threshold may at least include a reversal of a same type, a reversal of different types, or a reversal of a minority type. Each category of the reversal threshold may include one or more data types. In some embodiments, the category of the reversal threshold and the type of the currently-displayed information data may constitute a complete set of data types.

In some embodiments, the data type may be obtained by classifying data labelled with data tags based on a classification algorithm. The classification algorithm, as a supervised machine learning method, may classify the labelled data types, and a count of types may be fixed. In some embodiments, the classification algorithm may include a decision tree algorithm, a K-nearest neighbor (KNN) algorithm, a Bayes algorithm, a support vector machine algorithm, or the like. In some embodiments, the data type may also be obtained by clustering massive data based on a clustering algorithm. In some embodiments, the clustering algorithm may also be used as a pre-processing operation of the classification algorithm in a data mining algorithm. The clustering algorithm may be an unsupervised machine learning method that does not require a manual labeling and a pre-training of the classifier. The types may be automatically generated during the clustering process and the type data may be uncertain. Preferably, data with a subtype label may be clustered into data with a major type label based on the clustering algorithm. For example, a part of the data may have a subtype label such as a football, a UEFA champions league, a star Messi, a Barcelona football club, a recent event, etc. The other part of the data may have a subtype label such as a basketball, an NBA, a star Curry, a golden state warrior, a regular season, etc. The two parts of data may be clustered into the data with a major type label based on a similarity degree or a deep learning algorithm, and the major type label may be sports. In some embodiments, the clustering algorithm may include a K-Means clustering algorithm, a mean shift clustering algorithm, a density-based clustering algorithm (a density-based spatial clustering of applications with noise, DBSCAN), an expectation-maximization (EM) clustering algorithm with Gaussian hybrid model (GMM), an agglomerative hierarchical clustering algorithm, a graph community detection (a graph community detection) clustering algorithm.

In some embodiments, the data type may be obtained in real-time or in advance. The real-time acquisition may be obtained based on a classification algorithm or a clustering algorithm. In some embodiments, the data type may be obtained based on a factor such as a time, a degree of popularity, a scenario, a collaborative recommendation, etc. For example, the data type of data updated in the past week, the data type of the latest/hottest data, and the data type of data generated by a data producer that the platform cooperates with may be obtained.

The following may use a specific example to describe the process for obtaining the type of the possibly-interested information of the user.

For example, the data type may include major types M={m1, m2, m3}, N={n1, n2, n3}, O={o1, o2, o3}, P={p1, p2, p3}, wherein m1, . . . , p1, etc., may represent a subcategory in the major type. If the type of the currently-displayed information data are m1 and n2, the type of the possibly-interested information of the user may be a combination of one or more different data types in {m2, m3, n1, n3, O={o1, o2, o3}, P={p1, p2, p3}}. The combination of the one or more different data types may form a plurality of databases of the type of the possibly-interested information of the user. The database of the type of the possibly-interested information of the user may include a combination of $(C_{10}^1 \times C_{10}^2 \times C_{10}^3 \times C_{10}^4 \times C_{10}^5 \times C_{10}^6 \times C_{10}^7 \times C_{10}^8 \times C_{10}^9 \times C_{10}^{10})$ data types corresponding to the type of the possibly-interested information of the user {m2}, {m3}, . . . , {m2, m3, n1, n3, O={o1, o2, o3}, and P={p1, p2, p3}}.

In operation 430, possibly-interested information of the user may be determined based on the type of the possibly-interested information of the user. In some embodiments, operation 430 may be performed by the determination module 220.

Each information type may have one or more corresponding information data. In some embodiments, the possibly-interested information of the user may be determined based on the type of the possibly-interested information of the user. Taking the above example as the example, the database of the type of the possibly-interested information of the user may include a combination of $(C_{10}^1 33\ C_{10}^2 \times C_{10}^3 \times C_{10}^4 \times C_{10}^5 \times C_{10}^6 \times C_{10}^7 \times C_{10}^8 \times C_{10}^9 \times C_{10}^{10})$ data types corresponding to the type of the possibly-interested information of the user {m2}, {m3}, . . . , {m2, m3, n1, n3, O={o1, o2, o3}, and P={p1, p2, p3}}. The possibly-interested information of the user may be information data corresponding to the combination of $(C_{10}^1 \times C_{10}^2 \times C_{10}^3 \times C_{10}^4 \times C_{10}^5 \times C_{10}^6 \times C_{10}^7 \times C_{10}^8 \times C_{10}^9 \times C_{10}^{10})$ data types. Since there are one or more information data corresponding to the each information type, the amount of possibly-interested information of the user may be relatively large, which are not listed here.

It should be noted that the above description of the process 400 is merely provided for the purposes of illustration, and not intended to limit the scope of the present disclosure. For persons having ordinary skills in the art, multiple variations and modifications may be made to the process 400 under the teachings of the present disclosure. However, those variations and modifications do not depart from the scope of the present disclosure. For example, the data type and the type of the possibly-interested information of the user in process 400 may not be limited to the number listed, and may also be other numbers. As another example, in operation 420, the type of the possibly-interested information of the user may be obtained by performing a reversal operation can be replaced with: at least one data type other than the type of the currently-displayed information data may be selected from the complete set of data types as the type of the possibly-interested information of the user.

FIG. 5 is an exemplary flowchart of a process for determining possibly-interested information of a user according to some embodiments of the present disclosure. As shown in FIG. 5, process 500 for determining the possibly-interested information of the user may include:

In operation 510, historical browsing information of a user may be obtained in response to receiving an information refresh request from the user. In some embodiments, operation 510 may be performed by the obtaining module 210.

In some embodiments, the historical browsing information of the user may include multi-dimensional information such as a browsing content, a browsing time, a browsing frequency, etc., on a current application that the user browses before (e.g., one month, one week, three days, or one day) a current moment. The browsing information may include a picture, a text, a video, an audio, or the like. In some embodiments, the historical browsing information of the user may include, but is not limited to, a content and/or a time of a post, a follow, a favorite, a comment, a like, or the like.

In some embodiments, the historical browsing information of the user may include cloud-stored historical browsing data or locally stored cookie data. The cloud-stored historical browsing data may be the historical browsing data of the user stored in a cloud storage (e.g., the storage device 130). The locally stored cookie data may include a small text file stored in a local client terminal (e.g., the user terminal 120). The cookie data may include personal information and the historical browsing data of the user.

In some embodiments, the obtaining module 210 may obtain the historical browsing information of the user from the cloud storage or the local client terminal of the user in response to receiving the information refresh request from the user.

A portrait of the user may be determined, and a data support may also be provided for various operating projects by analyzing the historical browsing information of the user. For example, if a count of clicks on a specific product in a certain shop on a shopping website far exceeds that of other products, the merchants of the shop may be guided to increase the production or inventory of the specific product.

In operation 520, a type of information data that the user is not interested in may be determined based on the currently-displayed information data and the historical browsing information of the user. In some embodiments, operation 520 may be performed by the determination module 220.

In some embodiments, the type of the information data that the user is not interested in may be a type of information data that the user does not want to browse. In some embodiments, the type of information data that the user is not interested in may be determined based on the currently-displayed information data and the historical browsing information of the user, respectively. The type of information data that the user is not interested in may include the type of the currently-displayed information data and a type of historical preference of the user. More descriptions regarding determining the type of the currently-displayed information data based on the currently-displayed information data may be found in operation 410, which are not repeated here. In some embodiments, the type of historical preference of the user may be determined based on the historical browsing information of the user.

In some embodiments, if the historical browsing information of the user is the cloud-stored historical browsing data, the type of historical preference of the user may be obtained by processing the cloud-stored historical browsing data. Specifically, the type of historical preference of the user may be obtained by processing the historical browsing data using a machine learning model. The machine learning model may be the same as the machine learning model in operation 410, which are not repeated here. More descriptions regarding the training process of the machine learning model may be found in FIG. 6, which are not repeated here.

In some embodiments, if the historical browsing information of the user is the locally stored cookie data, the type attribute of the locally stored cookie data may be extracted as the type of historical preference of the user. Specifically, the locally stored cookie data may be obtained. The information refresh request and a data type (also referred to as a type attribute) of the cookie data may be extracted as the type of historical preference of the user. The locally stored cookie data may be an encrypted hash code. The server may decrypt the hash code, and read the data type as the type of historical preference of the user. For example, the cookie data decrypted by the server is: document. cookie="userID=828; userName=hulk; class=Basketball," and the data type of the cookie data is "basketball," thus the type of historical preference of the user may be "basketball."

The type of information data that the user is not interested in may be determined based on the type of the currently-displayed information data and the type of historical preference of the user.

In some embodiments, the determination module 220 may determine the type of information data that the user is not interested in based on the currently-displayed information data and the historical browsing information of the user.

In operation 530, a type of possibly-interested information of the user may be obtained by performing, based on the information refresh request and the type of information data that the user is not interested in, a reversal operation on the type of information data that the user is not interested in. In some embodiments, operation 530 may be performed by the determination module 220.

In some embodiments, at least one data type may be selected from a category of a reversal threshold as the type of the possibly-interested information of the user based on the type of information data that the user is not interested in. Specifically, data types may be obtained, and at least one data type other than the type of information data that the user is not interested in (i.e., in the category of the reversal threshold) may be selected from the data types as the type of the possibly-interested information of the user. In some embodiments, the category of the reversal threshold and the type of information data that the user is not interested in may form a complete set of data types. The reversal operation on the type of information data that the user is not interested in may be similar to the reversal operation on the type of the currently-displayed information data. More descriptions regarding the reversal operation may be found in operation 420, which are not repeated here.

In some embodiments, the determination module 220 may obtain the type of the possibly-interested information of the user by performing, based on the information refresh request and the type of information data that the user is not interested in, a reversal operation on the type of information data that the user is not interested in.

In operation 540, possibly-interested information of the user may be determined based on the type of the possibly-interested information of the user. In some embodiments, operation 540 may be performed by the display module 230.

More descriptions regarding operation 540 may be found in operation 430, which are not repeated here.

It should be noted that the above description of the process 500 is merely provided for the purposes of illustration, and not intended to limit the scope of the present disclosure. For persons having ordinary skills in the art, multiple variations and modifications may be made to the process 500 under the teachings of the present disclosure. However, those variations and modifications do not depart from the scope of the present disclosure. For example, in operation 530, the type of the possibly-interested information of the user may be obtained by performing a reversal operation can be replaced with: at least one data type other than the type of information data that the user is not interested in may be selected from the complete set of data types as the type of the possibly-interested information of the user.

Figure 6:
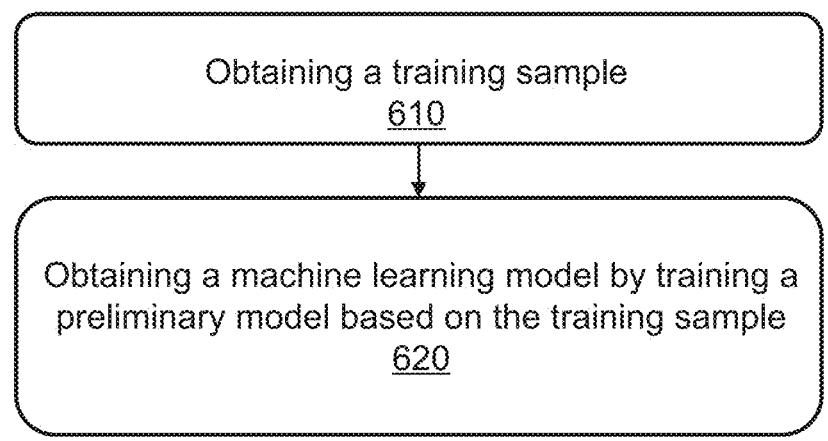
FIG. 6 is an exemplary flowchart of a process for training a machine learning model according to some embodiments of the present disclosure.

FIG. 6 is an exemplary flowchart of a process for training a machine learning model according to some embodiments of the present disclosure. In some embodiments, process 600 for training the machine learning model may be performed by the machine learning model training module 240.

In operation 610, a training sample may be obtained.

In some embodiments, the training sample may include a certain amount of historical displayed information data and types of the historical displayed information data. The training sample may be configured to train the machine learning model. The historical displayed information data may include historical displayed information data on a user terminal. The type of the historical displayed information data may be a data type corresponding to the historical displayed information data.

In some embodiments, operation 610 may also include pre-processing the obtained training sample to make the training sample satisfies a training requirement. The pre-processing may include a format conversion, a normalization, an identification, or the like.

In some embodiments, the machine learning model training module 240 may also label the obtained training sample. Specifically, the type of the historical displayed information data may be labelled as a type of reference information data. For example, in a certain training sample, it is known that the type of the historical displayed information data is "sports," then the training sample may be labelled as "sports." In some embodiments, the type of information data of the training sample may be obtained through a questionnaire survey. For example, a certain amount of historical displayed information data may be selected in advance, and the corresponding types of the information data may be obtained through a manual questionnaire survey. In some embodiments, the label process of the training sample may be performed manually or by computer programs.

In some embodiments, the training sample may be divided into a training set and a verification set. Specifically, the training sample may be divided based on a certain ratio. For example, a division ratio may be 80% for the training set and 20% for the verification set.

In some embodiments, the machine learning model training module 240 may access the information and/or data stored in the storage device 130 via the network 150 to obtain the training sample. In some embodiments, the machine learning model training module 240 may obtain the training sample via an interface. In some embodiments, the machine learning model training module 240 may obtain the training sample in other ways, which are not limited in the present disclosure.

In operation 620, a machine learning model may be obtained by training a preliminary model based on the training sample.

In some embodiments, the preliminary model may include a classification model, for example, a decision tree, a Bayes classification, a random forest, a support vector machine, a neural network, or the like. In some embodiments, the decision tree model may include, but is not limited to, a classification and regression tree (CART), an iterative dichotomiser 3 (ID3), a C4.5 algorithm, a random forest, a Chi-squared automatic interaction detection (CHAID), a multivariate adaptive regression splines (MARS), a gradient boosting machine (GBM), or the like, or any combination thereof.

In some embodiments, the training of the preliminary model may include the following operations. 1) The sample data may be divided into a training set, a verification set, and a test set. The sample data may be divided randomly based on a certain ratio. Preferably, the training set may account for 85%, the verification set may account for 10%, and the test set may account for 5%. 2) The sample data in the training set may be inputted into the preliminary model for training. When the training process satisfies a certain condition, for example, the number of training reaches an upper limit of a predefined number of iterations, or a value of a loss function is less than a predetermined value, the training process may be terminated to obtain a trained machine learning model. 3) The sample data in the verification set may be inputted into the trained machine learning model for calculation, and an output result of the type of information data may be obtained. 4) The output result of the sample data in the verification set in 3) and an identification corresponding to the sample data (e.g., a type of reference information data) may be compared to obtain a comparison result. In some embodiments, the comparison result may include that the output result matches and does not match the tag identification. The matching may indicate that a label difference between the output type of information data and the type of reference information data is within 2%, otherwise, it may be regarded as non-matching. If the comparison result satisfies a verification requirement (it may be set according to an actual need, for example, it may be set that, after training, the output type of information data for more than 95% of the sample data in the verification matches the tag of the type of reference information data), then proceed to step 5) for testing. Otherwise, it may be regarded as the requirement is not met (e.g., the accuracy of the output type of information data may be low). Parameters of the trained model may be adjusted, and step 2) may be performed again according to an adjusted model. 5) The sample data in the test set may be inputted into the trained machine learning model for calculation, and an output result may be obtained. 6) The output result of the sample data in the test set in step 5) and the identification corresponding to the sample data may be compared to determine whether the training result satisfies a requirement (it may be set according to an actual need, e.g., it may be set that, if the output result obtained by the trained model for more than 98% of the sample data in the test set matches the corresponding tag identification, the training result can be considered to satisfy the requirement, otherwise, it can be considered that the training result does not satisfy the requirement). If the training result does not satisfy the requirement, the sample data may be re-prepared, or the training set, the verification set, and the test set may be re-divided, and the training may be continued until the model test is passed.

Various changes may be made to the operations and implementation methods described above. For example, the training set, the verification set, and the test set may be divided according to other methods or ratios. Some of the operations may be omitted, and other operations may be added.

In some embodiments, the currently-displayed information data and the type of the currently-displayed information data may be used as training sample data to train the machine learning model, and the machine learning model may be iteratively updated. For example, after the type of the currently-displayed information data is determined, the type of the currently-displayed information data may be used as the training sample to update the machine learning model. When the user uses a current application or a third-party application again, the accuracy of the determination of the type of the currently-displayed information data may be improved.

In some embodiments, the machine learning model training module 240 may access the information and/or the data stored in the storage device 130 via the network 150 to train a preliminary model based on the training sample to obtain the machine learning model.

It should be noted that the above description of the process 600 is merely provided for the purposes of illustration, and not intended to limit the scope of the present disclosure. For persons having ordinary skills in the art, multiple variations and modifications may be made to the process 600 under the teachings of the present disclosure. However, those variations and modifications do not depart from the scope of the present disclosure. For example, operation 620 in process 600 may further be subdivided into operation 620 for model training, operation 630 for model verification, and operation 640 for model testing, or other operations. As another example, the division ratio may be 90% for the training set, 7% for the verification set, and 3% for the test set.

The possible beneficial effects of the embodiments of the present disclosure may include but are not limited to: (1) The possibly-interested information of the user may be determined based on the currently-displayed information data, and data content of a different type from the currently-displayed information data may be recommended to the user, which may broaden a browsing horizon of the user. (2) A simple information refresh request input way may be set on a user terminal, which may simplify an interactive operation between the user and an interface of the user terminal, and improve user experience. It should be noted that different embodiments may have different beneficial effects. In different embodiments, the possible beneficial effects may be any one or a combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system."

Furthermore, aspects of the present disclosure may take the form of a computer program product embodied in one or more computer readable media having computer readable program code embodied thereon.

A computer storage medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer storage medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for refreshing current page information, implemented on a computing device having at least one processor, at least one storage medium, and a communication platform connected to a network, comprising:
    in response to receiving, via the network, a reverse-information refresh request through a terminal from a user, obtaining, by the at least one processor, currently-displayed information data of the terminal, wherein the reverse-information refers to other information of a different type from the currently-displayed information data, the reverse-information refresh request includes a reversal threshold, and the reversal threshold is used to characterize a degree of association between refreshed information and the currently-displayed information data;
    determining, by the at least one processor, possibly-interested information of the user based on the reverse-information refresh request and the currently-displayed information data; and
    displaying, by the at least one processor, the possibly-interested information of the user on an interface of the terminal.

2. The method of claim 1, wherein the reverse-information refresh request from the user is made by a coded gesture, a continuous click operation, a key click operation, a touch screen operation in a pause state, a continuous shaking operation, a voice input operation, a face recognition, a facial expression recognition, or an iris recognition.

3. The method of claim 1, wherein a category of the reversal threshold at least includes a reversal of a same type, a reversal of different types, or a reversal of a minority type.

4. The method of claim 3, wherein the degree of association is adjusted by setting a proportion of the reversal of the same type, the reversal of the different types, or the reversal of the minority type in the category of the reversal threshold.

5. The method of claim 4, wherein
    the reversal of the same type is a reversal of a subtype in a same major type,
    the reversal of the different types is a reversal of a major type, and
    the reversal of the minority type is a type including the major type and the subtype with low attention and few attention.

6. The method of claim 4, wherein
    the reverse-information refresh request further includes an instruction to request a recommendation of the other information of the different type from the currently-displayed information data, and
    the reversal threshold includes a plurality of levels configured to determine a reversal degree of the recommendation, the reversal degree being configured to determine the proportion of the reversal of the same type, the reversal of the different types, or the reversal of the minority type included in the recommendation.

7. The method of claim 1, wherein a setting manner of the reversal threshold includes at least one of: a radar chart, a percentage, or a level.

8. The method of claim 1, wherein the determining, by the at least one processor, possibly-interested information of the user based on the information refresh request and the currently-displayed information data comprises:
    determining a type of the currently-displayed information data based on the currently-displayed information data;
    obtaining a type of the possibly-interested information of the user by performing, based on the reverse-information refresh request and the type of the currently-displayed information data, a reversal operation on the type of the currently-displayed information data; and
    determining the possibly-interested information of the user based on the type of the possibly-interested information of the user.

9. The method of claim 8, wherein the determining a type of the currently-displayed information data based on the currently-displayed information data comprises:
    determining the type of the currently-displayed information data by processing the currently-displayed information data using a machine learning model.

10. The method of claim 9, wherein the machine learning model includes a classification model, and the machine learning model is obtained according to a process including:
    obtaining a training sample, wherein the training sample includes historical displayed information data and a type of the historical displayed information data, and the type of the historical displayed information data is labelled as a type of reference information data;
    obtaining the machine learning model by training a preliminary model based on the training sample.

11. The method of claim 8, wherein the obtaining a type of the possibly-interested information of the user by performing, based on the reverse-information refresh request and the type of the currently-displayed information data, a reversal operation on the type of the currently-displayed information data comprises:

selecting, based on the type of the currently-displayed information data, at least one data type from a category of the reversal threshold as the type of the possibly-interested information of the user.

12. The method of claim 1, wherein the determining, by the at least one processor, possibly-interested information of the user based on the reverse-information refresh request and the currently-displayed information data comprises:

in response to receiving the reverse-information refresh request from the user, obtaining historical browsing information of the user;

determining a type of information data that the user is not interested in based on the currently-displayed information data and the historical browsing information of the user;

obtaining a type of the possibly-interested information of the user by performing, based on the reverse-information refresh request and the type of information data that the user is not interested in, a reversal operation on the type of the information data that the user is not interested in; and determining the possibly-interested information of the user based on the type of the possibly-interested information of the user.

13. The method of claim 1, wherein the displaying, by the at least one processor, the possibly-interested information of the user on an interface of the terminal comprises:

displaying at least part of the possibly-interested information of the user on the interface of the terminal of the user according to a feed stream.

14. A system for refreshing current page information, comprising:

at least one storage device configured to store computer instructions;

at least one processor in communicate with the at least one storage device, wherein when the at least one processor executes the computer instructions, the at least one processor causes the system to:

in response to receiving, via a network, a reverse-information refresh request through a terminal from a user, obtain currently-displayed information data of the terminal, wherein the reverse-information refers to other information of a different type from the currently-displayed information data, the reverse-information refresh request includes a reversal threshold, and the reversal threshold is used to characterize a degree of association between refreshed information and the currently-displayed information data;

determine possibly-interested information of the user based on the reverse-information refresh request and the currently-displayed information data; and display the possibly-interested information of the user on an interface of the terminal.

15. The system of claim 14, wherein to determine possibly-interested information of the user based on the reverse-information refresh request and the currently-displayed information data, the at least one processor further causes the system to:

determine a type of the currently-displayed information data based on the currently-displayed information data;

obtain a type of the possibly-interested information of the user by performing, based on the reverse-information refresh request and the type of the currently-displayed information data, a reversal operation on the type of the currently-displayed information data; and determine the possibly-interested information of the user based on the type of the possibly-interested information of the user.

16. The system of claim 15, wherein to determine a type of the currently-displayed information data based on the currently-displayed information data, the at least one processor further causes the system to:

determine the type of the currently-displayed information data by processing the currently-displayed information data using a machine learning model.

17. The system of claim 15, wherein to obtain a type of the possibly-interested information of the user by performing, based on the type of the currently-displayed information data, a reversal operation on the type of the currently-displayed information data, the at least one processor further causes the system to:

select, based on the type of the currently-displayed information data, at least one data type from a category of a reversal threshold as the type of the possibly-interested information of the user.

18. The system of claim 14, wherein to determine the possibly-interested information of the user based on the type of the possibly-interested information of the user, the at least one processor further causes the system to:

in response to receiving the reverse-information refresh request from the user, obtain historical browsing information of the user;

determine a type of information data that the user is not interested in based on the currently-displayed information data and the historical browsing information of the user;

obtain a type of the possibly-interested information of the user by performing, based on the reverse-information refresh request and the type of information data that the user is not interested in, a reversal operation on the type of information data that the user is not interested in; and determine the possibly-interested information of the user based on the type of the possibly-interested information of the user.

19. The system of claim 14, wherein to display the possibly-interested information of the user, the at least one processor further causes the system to:

display at least part of the possibly-interested information of the user on the interface of the terminal of the user according to a feed stream.

20. A computer-readable storage medium, wherein the storage medium stores computer instructions, when a computer reads the computer instructions in the storage medium, the computer executes a method, comprising:

in response to receiving, via a network, a reverse-information refresh request through a terminal from a user, obtaining currently-displayed information data of the terminal, wherein the reverse-information refers to other information of a different type from the currently-displayed information data, the reverse-information refresh request includes a reversal threshold, and the reversal threshold is used to characterize a degree of association between refreshed information and the currently-displayed information data;

determining possibly-interested information of the user based on the reverse-information refresh request and the currently-displayed information data; and displaying the possibly-interested information of the user on an interface of the terminal.

\* \* \* \* \*